United States Patent
Branson et al.

(10) Patent No.: US 8,516,490 B2
(45) Date of Patent: *Aug. 20, 2013

(54) RULE-BASED DYNAMIC RESOURCE ADJUSTMENT FOR UPSTREAM AND DOWNSTREAM PROCESSING UNITS IN RESPONSE TO AN INTERMEDIATE PROCESSING UNIT EVENT

(71) Applicant: International Business Machines Corporation, Armonk, NY (US)

(72) Inventors: Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/754,588

(22) Filed: Jan. 30, 2013

(65) Prior Publication Data

US 2013/0124599 A1    May 16, 2013

Related U.S. Application Data

(63) Continuation of application No. 12/357,984, filed on Jan. 22, 2009.

(51) Int. Cl.
*G06F 9/50* (2006.01)

(52) U.S. Cl.
USPC .......................................... 718/104; 709/226

(58) Field of Classification Search
None
See application file for complete search history.

(56) References Cited

U.S. PATENT DOCUMENTS

| | | |
|---|---|---|
| 6,745,221 B1 | 6/2004 | Ronca |
| 7,430,741 B2 | 9/2008 | Ayachitula et al. |
| 7,565,656 B2 | 7/2009 | Yamasaki et al. |
| 7,693,995 B2 | 4/2010 | Kudo et al. |
| 7,925,755 B2 * | 4/2011 | Diep et al. ................. 709/226 |
| 8,386,995 B2 * | 2/2013 | Coleman et al. ............. 717/103 |
| 2006/0224740 A1 | 10/2006 | Sievers-Tostes et al. |
| 2009/0119673 A1 | 5/2009 | Bubba |
| 2009/0133029 A1 | 5/2009 | Varadarajan et al. |

* cited by examiner

*Primary Examiner* — David J Huisman
(74) *Attorney, Agent, or Firm* — Martin & Associates LLC; Bret J. Petersen

(57) ABSTRACT

A method dynamically adjusts the resources available to a processing unit of a distributed computer process executing on a multi-node computer system. The resources for the processing unit are adjusted based on the data other processing units handle or the execution path of code in an upstream or downstream processing unit in the distributed process or application.

8 Claims, 6 Drawing Sheets

| Data Event Rules | 312 |
|---|---|
| Event              410 | Action              412 |
| PU-620, qty > 10000           414 | PU-624 +CPU(500%) + Memory (200%)<br>PU-614 -CPU(200%)              416 |
| PU-624, Data = video           418 | PU-624 +CPU(300%) + Memory (100%) |

| Code Point Rules | 314 |
|---|---|
| Event              510 | Action              512 |
| PU-620, Line 281 | PU-624 +CPU(500%) + Memory (200%) |
| PU-624, Line 17 | PU-624 +CPU(300%) + Memory (100%) |

| Rules Registry 144 | | |
|---|---|---|
| Data Event Rules 312 | Code Point Rules 314 | Other Rules 316 |

FIG. 3

| Data Event Rules 312 | |
|---|---|
| Event 410 | Action 412 |
| PU-620, qty > 10000 414 | PU-624 +CPU(500%) + Memory (200%) PU-614 -CPU(200%) 416 |
| PU-624, Data = video 418 | PU-624 +CPU(300%) + Memory (100%) |

FIG. 4

| Code Point Rules 314 | |
|---|---|
| Event 510 | Action 512 |
| PU-620, Line 281 | PU-624 +CPU(500%) + Memory (200%) |
| PU-624, Line 17 | PU-624 +CPU(300%) + Memory (100%) |

FIG. 5

RULE-BASED DYNAMIC RESOURCE ADJUSTMENT FOR UPSTREAM AND DOWNSTREAM PROCESSING UNITS IN RESPONSE TO AN INTERMEDIATE PROCESSING UNIT EVENT

CROSS-REFERENCE TO RELATED APPLICATION

This patent application is a continuation of U.S. Ser. No. 12/357,984 filed on Jan. 22, 2009, which is incorporated herein by reference.

BACKGROUND

1. Technical Field

The disclosure and claims herein generally relate to computer process allocation and distribution on a multi-node computer system, and more specifically relate to dynamic resource adjustment of a distributed computer process on a multi-node computer system.

2. Background Art

Supercomputers and other multi-node computer systems continue to be developed to tackle sophisticated computing jobs. One type of multi-node computer system is a massively parallel computer system. A family of such massively parallel computers is being developed by International Business Machines Corporation (IBM) under the name Blue Gene. The Blue Gene/L system is a high density, scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack.

Computer systems such as Blue Gene have a large number of nodes, each with its own processor and local memory. The nodes are connected with several communication networks. One communication network connects the nodes in a logical tree network. In the logical tree network, the nodes are connected to an input-output (I/O) node at the top of the tree. In Blue Gene, there are 2 compute nodes per node card with 2 processors each. A node board holds 16 node cards and each rack holds 32 node boards. A node board has slots to hold 2 I/O cards that each have 2 I/O nodes.

A distributed process is a computer application or program or portion of a computer program where one or more portions of the distributed process are allocated to different hardware resources. In a distributed process across many nodes a traditional program can be thought of as an execution of "processing units" that are dispersed and executed over multiple nodes. In this type of distributed environment, one is often unaware of what node a given processing unit is running Processing units are often detached from one another and may be unaware of where other processing units are running. In this type of distributed environment, adjusting priorities of processing units or adjusting compute resources is not a simple task. Simply moving compute resources around from node to node as a reaction to the current needs or current job priorities is simply inadequate. For example, in a distributed environment a piece of code or a processing unit may be executed on behalf of many different applications or jobs. In some cases, these processing units will have higher priority than others but in many cases they will not. Furthermore, an application may or may not have a consistent priority throughout its execution. In some cases, the priority of the application may be more appropriately determined by the data that it is handling or changes in the means and mechanisms needed to carry out the entire job.

Without an efficient way to allocate resources to processing units in a distributed computer system environment, complex computer systems will continue to suffer from reduced performance and increased power consumption.

BRIEF SUMMARY

The specification and claims herein are directed to dynamically adjusting the resources available to a processing unit of a distributed computer process executing on a multi-node computer system. The resources for the processing unit are adjusted based on the data other processing units handle or the execution path of code in an upstream or downstream processing unit in the distributed process or application.

The description and examples herein are directed to a massively parallel computer system such as the Blue Gene architecture, but the claims herein expressly extend to other parallel computer systems with multiple processors arranged in a network structure.

The foregoing and other features and advantages will be apparent from the following more particular description, and as illustrated in the accompanying drawings.

BRIEF DESCRIPTION OF DRAWINGS

The disclosure will be described in conjunction with the appended drawings, where like designations denote like elements, and:

FIG. 3 shows a block diagram of a sample rules registry;

FIG. 4 shows examples of data event rules stored in the rules registry;

FIG. 5 shows examples of code point rules stored in the rules registry;

DETAILED DESCRIPTION

The specification and claims herein are directed to dynamically adjusting the resources available to a processing unit of a distributed computer process executing on a multi-node computer system. The resources for the processing unit are adjusted based on the data other processing units handle or the execution path of code in an upstream or downstream processing unit in the distributed process or application. The examples herein will be described with respect to the Blue Gene/L massively parallel computer developed by International Business Machines Corporation (IBM).

Figure 1:
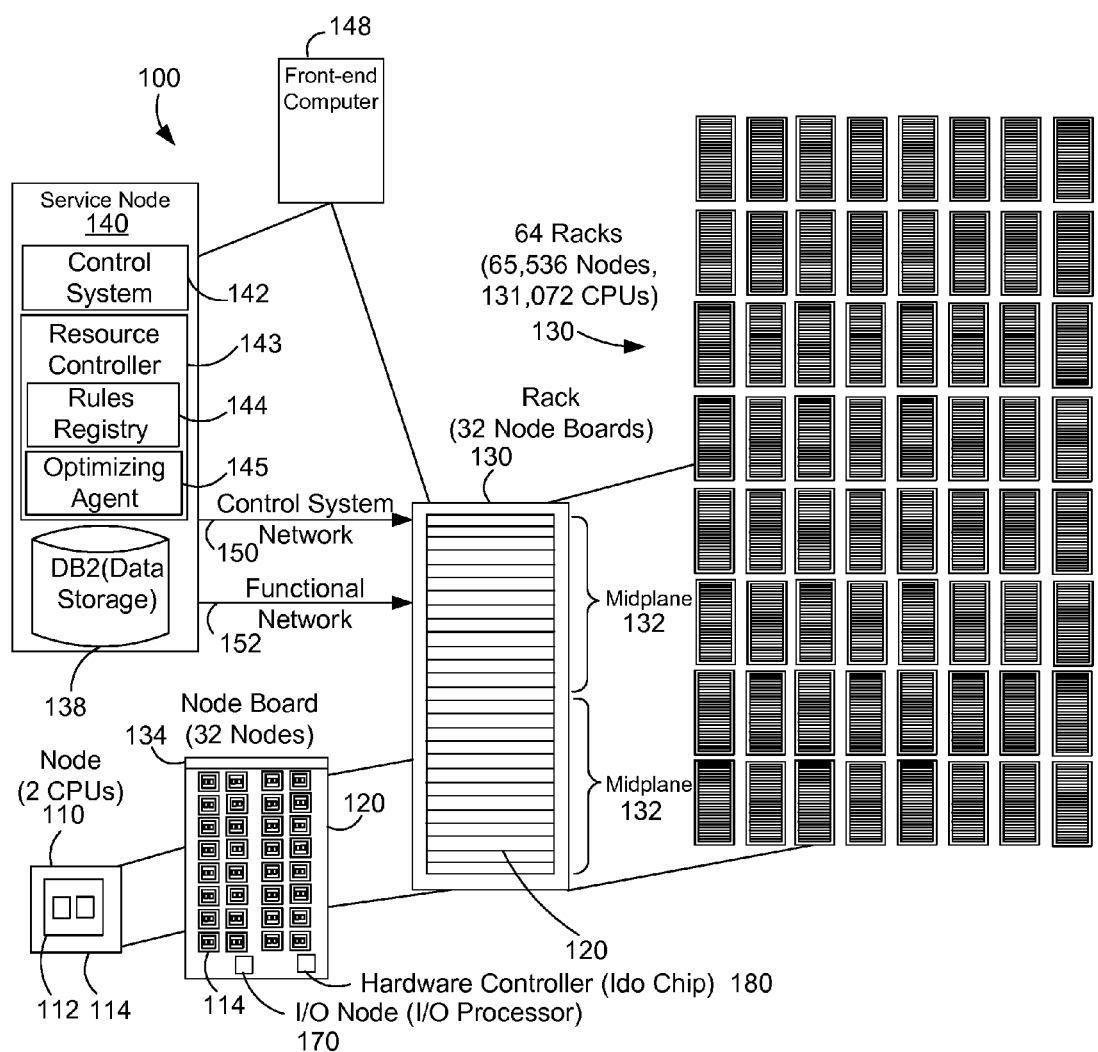
FIG. 1 is a block diagram of a massively parallel computer system.

FIG. 1 shows a block diagram that represents a massively parallel computer system 100 such as the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board with a midplane connector 134. The midplane circuit board is inside the rack and not shown in FIG. 1. The midplane 132 includes all the node boards connected to the midplane printed circuit board and the nodes in the node boards. The full Blue Gene/L computer system would be housed in 64 racks 130 or cabinets with 32 node boards 120 in each. The full system would then have 65,536 nodes and 131,072 CPUs (64 racks×32 node boards×32 nodes×2 CPUs).

The Blue Gene/L computer system structure can be described as a compute node core with an I/O node surface, where each I/O node has an I/O processor connected to the service node 140. The service node 140 is connected to the nodes thorough a control system network 150 and a functional network 152. The functional network is a gigabit Ethernet network connected to an I/O processor (or Blue Gene/L link chip) in the I/O node 170 located on a node board 120 that handles communication from the service node 160 to a number of nodes. The Blue Gene/L system has one or more I/O nodes 170 connected to the node board 120. The I/O processors can be configured to communicate with 8, 32 or 64 nodes. The service node 140 uses the control system network 150 to control connectivity by communicating to link cards on the compute nodes. The connections to the I/O nodes are similar to the connections to the compute node except the I/O nodes are not connected to the torus network that interconnects the compute nodes.

Again referring to FIG. 1, the computer system 100 includes a service node 140 that handles the loading of the nodes with software and controls the operation of the whole system. The service node 140 is typically a mini computer system such as an IBM PSERIES server running Linux with a control console (not shown). The service node 140 is connected to the racks 130 of compute nodes 110 with a control system network 150 and a functional network 152. The control system network provides control, test, and bring-up infrastructure for the Blue Gene/L system. The control system network 150 includes various network interfaces that provide the necessary communication for the massively parallel computer system. The service node 140 is also connected to one or more front-end computers 148.

The service node 140 communicates through the control system network 150 dedicated to system management. The control system network 150 includes a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node.

The service node includes a database 138 (DB2) for local data storage. The service node further includes a control system 142 to control the operation of the multi-node computer system 100. The service node 140 also includes a resource controller 143 for allocating and scheduling work processes and data placement on the compute nodes. The resource controller 143 includes a rules registry 144 and an optimizing agent 145. These are described further below.

Figure 2:
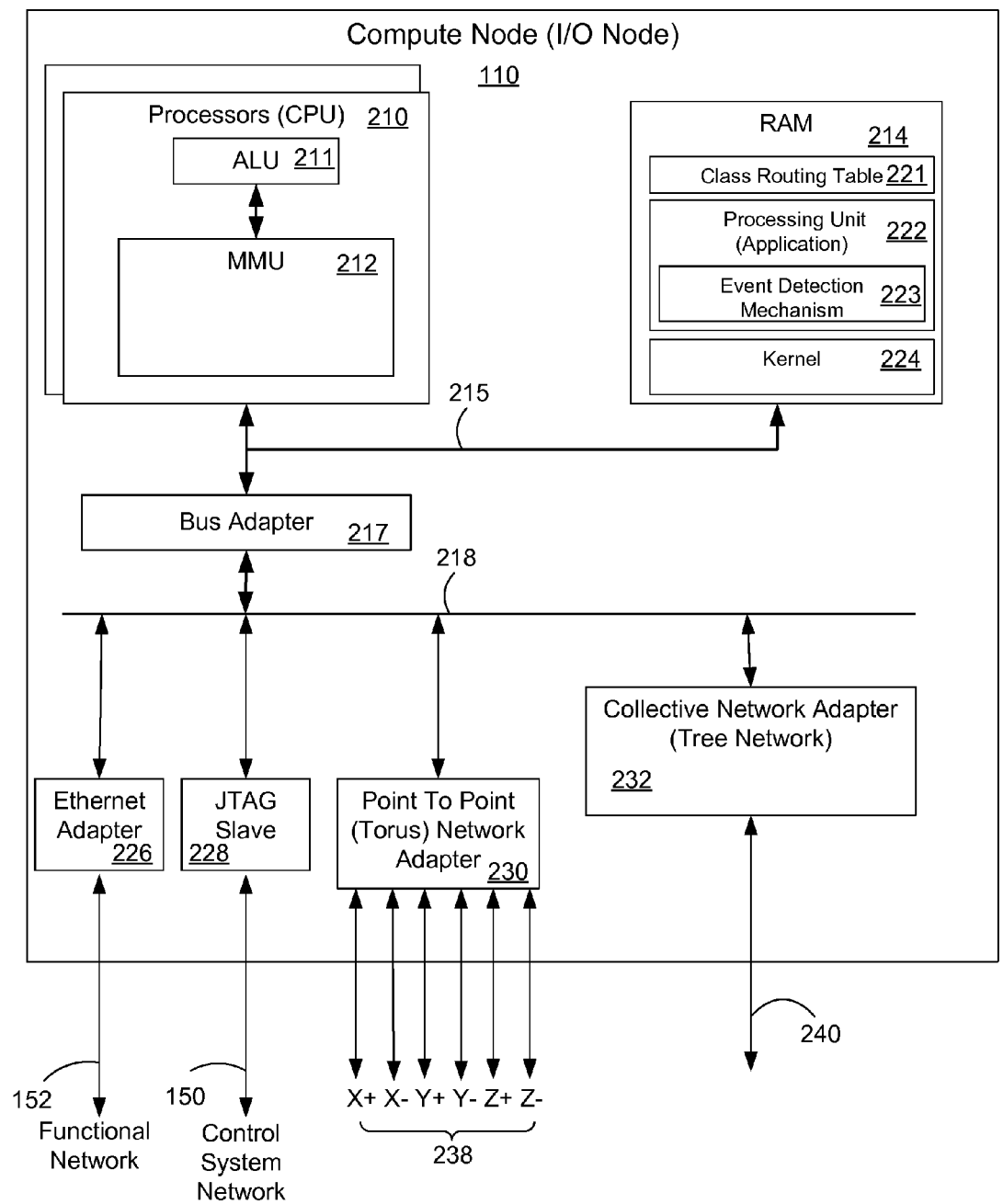
FIG. 2 is a block diagram of a compute node in a massively parallel computer system.

FIG. 2 illustrates a block diagram of an exemplary compute node 110 as introduced above. FIG. 2 also represents a block diagram for an I/O node, which has the same overall structure as the compute node. A notable difference between the compute node and the I/O nodes is that the Ethernet adapter 226 is connected to the control system on the I/O node but is not used in the compute node. The compute node 110 of FIG. 2 includes a plurality of computer processors 210, each with an arithmetic logic unit (ALU) 211 and a memory management unit (MMU) 212. The processors 210 are connected to random access memory (RAM) 214 through a high-speed memory bus 215. Also connected to the high-speed memory bus 215 is a bus adapter 217. The bus adapter 217 connects to an extension bus 218 that connects to other components of the compute node.

Again referring to FIG. 2, stored in RAM 214 is a class routing table 221, a processing unit (or application) 222 that includes an event detection mechanism 223, and an operating system kernel 224. The class routing table 221 stores data for routing data packets on the collective network or tree network as described more fully below. The processing unit 222 is a user software application, process or job that is loaded on the node by the control system to perform a designated task. The application program typically runs in parallel with application programs running on adjacent nodes. As used herein, processing unit means an application or job or a portion of the application or job executing in one or more nodes of the system. The processing unit includes an event detection mechanism 223. The event detection mechanism is used to monitor events stored in a rules registry as described below. The operating system kernel 224 is a module of computer program instructions and routines for an application program to access to other resources of the compute node. The quantity and complexity of tasks to be performed by an operating system on a compute node in a massively parallel computer are typically smaller and less complex than those of an operating system on a typical stand alone computer. The operating system may therefore be quite lightweight by comparison with operating systems of general purpose computers, a pared down version as it were, or an operating system developed specifically for operations on a particular massively parallel computer.

The compute node 110 of FIG. 2 includes several communications adapters 226, 228, 230, 232 for implementing data communications with other nodes of a massively parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network.

The data communications adapters in the example of FIG. 2 include a Gigabit Ethernet adapter 226 that couples example I/O node 110 for data communications to a Gigabit Ethernet on the Functional network 152. In Blue Gene, this communication link is only used on I/O nodes and is not connected on the compute nodes. Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit 228 that couples the compute node 110 for data communications to a JTAG Master circuit over a JTAG network or control system network 150. JTAG is the usual name used for the IEEE 1149.1 standard entitled Standard Test Access Port and Boundary-Scan Architecture for test access ports used for testing printed circuit boards using boundary scan. JTAG boundary scans through JTAG Slave 228 may efficiently configure processor registers and memory in compute node 110.

The data communications adapters in the example of FIG. 2 include a Point To Point Network Adapter 230 that couples the compute node 110 for data communications to a network 238. In Blue Gene, the Point To Point Network is typically configured as a three-dimensional torus or mesh. Point To Point Adapter 230 provides data communications in six directions on three communications axes, x, y, and z, through six bidirectional links 238: x+, x−, y+, y−, z+, and z−. The torus network logically connects the compute nodes in a lattice like structure that allows each compute node 110 to communicate with its closest 6 neighbors.

The data communications adapters in the example of FIG. 2 include a collective network or tree network adapter 232 that couples the compute node 110 for data communications to a network 240 configured as a binary tree. This network is also sometimes referred to as the collective network. Collective network adapter 232 provides data communications through three bidirectional links: two links to children nodes and one link to a parent node (not shown). The collective network adapter 232 of each node has additional hardware to support operations on the collective network.

Again referring to FIG. 2, the collective network 240 extends over the compute nodes of the entire Blue Gene machine, allowing data to be sent from any node to all others (broadcast), or a subset of nodes. Each node typically has three links, with one or two links to a child node and a third connected to a parent node. Arithmetic and logical hardware is built into the collective network to support integer reduction operations including min, max, sum, bitwise logical OR, bitwise logical AND, and bitwise logical XOR. The collective network is also used for global broadcast of data, rather than transmitting it around in rings on the torus network.

The specification and claims herein are directed to dynamically adjusting the resources available to a processing unit. The resource controller 143 (FIG. 1) adjusts the resources for a processing unit based on the data another processing unit handles or the code that executes in an upstream or downstream processing unit in the distributed process or application. Data that is being consumed or produced by a given processing unit is referred herein as data of the processing unit or data handled by the processing unit. The processing unit data is analyzed to be used to signal a shift in resources of upstream and downstream processing units. Alternatively, the resource controller dynamically adjusts compute resources based off reaching specific execution points in a processing unit. In this scenario, a processing unit reaching a specific point in execution would trigger the resource controller to automate the movement of resources. This could be advantageous where a processing unit normally takes a long time to run a process or method that has downstream repercussions. For example, if processing unit A takes a long time for a process B, the resource controller could affect job workflow of downstream compute nodes by slowing down processing units upstream of processing unit A and likewise adjust processing units downstream. The resource controller can adjust the resources downstream because they will not need to do as much subsequent processing right away, and it might adjust resources upstream to slow down future work it might do, both resulting in more resources available to other jobs or other parts of the application. This type of adjusting of resources could free up resources for other running processing units on different nodes.

As described above, the resource controller 143 (FIG. 1) adjusts the resources for a processing unit based on the data another processing unit handles or the code that executes in an upstream or downstream processing unit. As used herein, compute resources means hardware resources such as central processing unit (CPU) resources, memory, network resource, or virtual allocation of CPU, memory and network resources. Compute resources could also be software resources available to a node. The resource controller adjusts resources to a processing unit in different ways depending on the system architecture. The resource controller can adjust the compute resources by moving other processes on the same node to other nodes to free up the node's resources for the remaining processing unit. In a distributed computing system with virtual resources, the resource controller can dedicate more system resources by increasing the virtual allocation of CPU, memory, or network bandwidth as described in the example below.

FIG. 3 shows a block diagram that represents one specific implementation of the rules registry 144 introduced in FIG. 1 above. The rules registry 144 includes several different types of rules that are used by the resource controller to determine how to handle certain events to dynamically adjust computer resources of a distributed computer process on a multi-node computer system. The rules registry 144 shown in FIG. 3 includes data event rules 312, code point rules 314 and other rules 316. The data event rules 312 and code point event rules 314 are described further below. The other rules 316 represent other possible rules that could be used to allocate resources as described and claimed herein. The events in the rules registry could be detected by various means. These various means include an event detection mechanism 223 as shown in FIG. 2. For example, code point events could be detected by the event detection mechanism like a debugger that tracks the execution of the code. Alternatively, the event detection mechanism 223 could be code that is generated and placed at the code point that notifies the resource controller of the detected event. Thus a user or software tool identifies a code point associated with a rule, and generates code for the event detection mechanism that is inserted into the executable of the processing unit (PU) at the appropriate code point. Similarly, for input-driven rules, the event detection mechanism could monitor data flowing in and out of the processing unit. Alternatively, the processing units typically function within an execution control system or framework which provides each PU with the ability to know when data has been sent to it. In this case the event detection mechanism could be additional code that is generated and placed into the executable of any processing unit that had an input rule defined. This code would be placed at the point of the PU that handles data input and output to detect the occurrence of the data event.

FIG. 4 illustrates some examples of data event rules 312. The data event rules have an event 410 and a corresponding action 412. Each event preferably specifies a processing unit identification (ID) and a condition that pertains to data. Each action 412 preferably specifies a node ID and an action to adjust compute resources, such as increase CPU or memory allocation. For example, the first example event 414 is for processing unit number 620 and the condition is a data quantity of greater than 10,000 records. The action 416 for this data event rule increases CPU by 500% and memory by 200% on processing unit 624, and decreases CPU by 200% on processing unit 614. The second event 418 is for a specific data type. Here an event is detected when the type of data handled by processing unit 624 is video (or a specific type of video). Similarly, FIG. 5 illustrates code point rules 314. Code point rules also have an event 510 and an action 512 that relate to a specific processing unit. The data in FIGS. 4 and 5 will be used in the example described with reference to FIG. 6.

Figure 6:
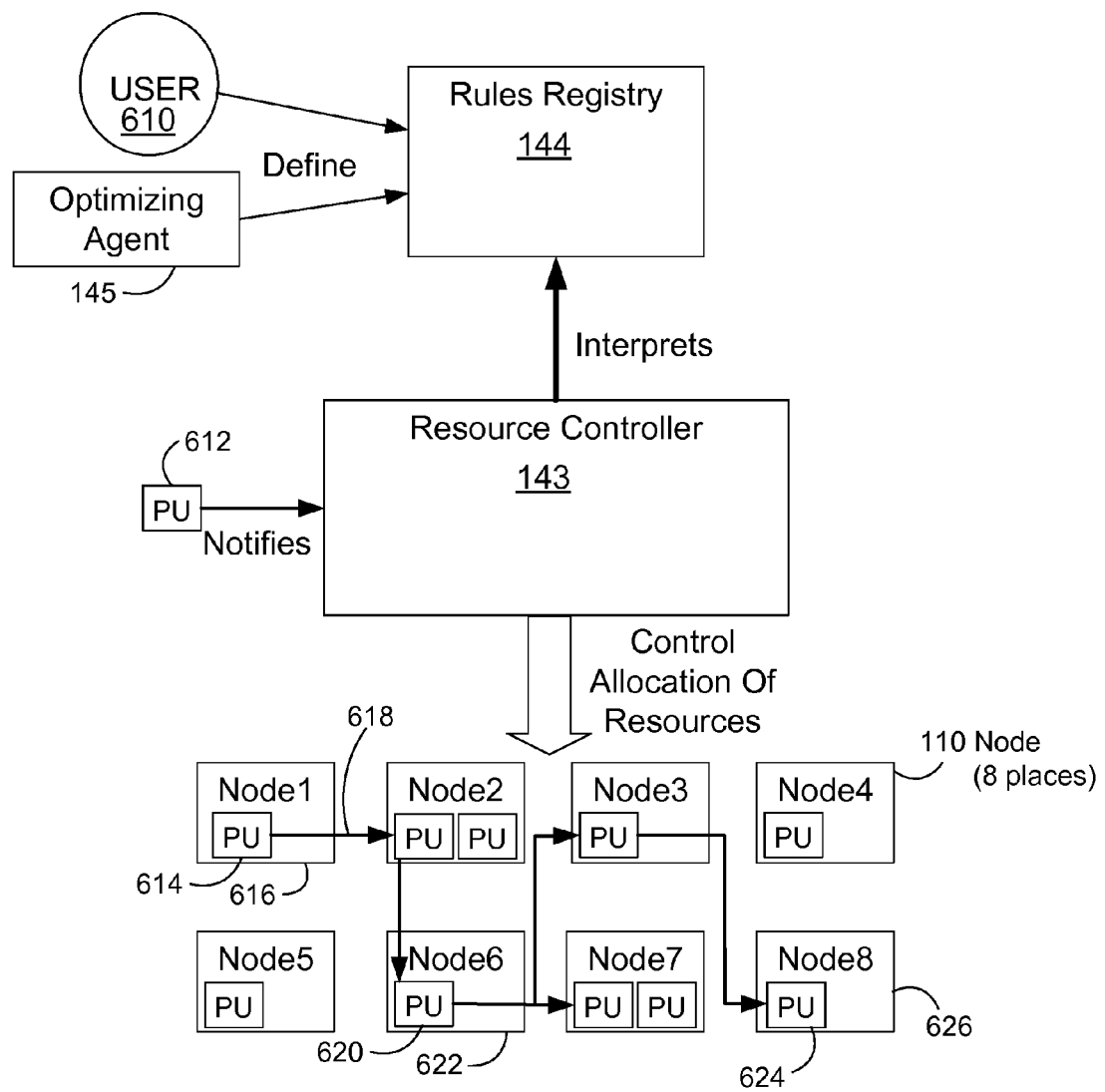
FIG. 6 shows a block diagram to illustrate an example of dynamic resource adjustment of a distributed computer process on a multi-node computer system.

An example will now be described with reference to FIG. 6. The resource controller 143 interprets rules in the rules registry 144 to determine how to dynamically control the allocation of compute resources such as for processing units on the compute nodes 110. The rules registry 144 has a number of rules as described above. These rules may be set by a user 610 or by an optimizing agent 145. The optimizing agent 145 is software that can monitor the performance of the resource controller and create rules similar to the rules described above. Processing unit 612 is shown in FIG. 6 to represent that the resource controller 143 is notified by processing units of events according to the rules registry 144. When the resource controller receives notification of a rules event, it controls allocation of compute resources as dictated by the rule action associated with the event as described above. Copies of the rules registry or portions of the rules registry may also be located in RAM 214 on a node 110 as shown in FIG. 2.

Again referring to the example of FIG. 6, a distributed application is represented by a series of processing units (including 614, 620, 624) that are connected by arrows 618 that represent a process flow or a flow of data. The arrows show the process flow as a path from one processing unit to the next that make up the distributed process. The first processing unit 614 in the process flow is located in Node1 616. The process then continues as indicated by the arrow 618 to the other processing units. In our example, we assume that processing unit 620 encounters an event 414 (FIG. 4) and notifies the resource controller 143. The resource controller takes the actions 416 (FIG. 4) as indicated in the rules registry to increase the CPU by 500% and increase memory by 200% on the downstream processing unit 624, and decrease the CPU by 200% on upstream processing unit 614, where a downstream processing unit (PU) is a PU that is subsequent in the process flow or data flow, and an upstream PU is a PU that is earlier in the process flow or data flow.

Figure 7:
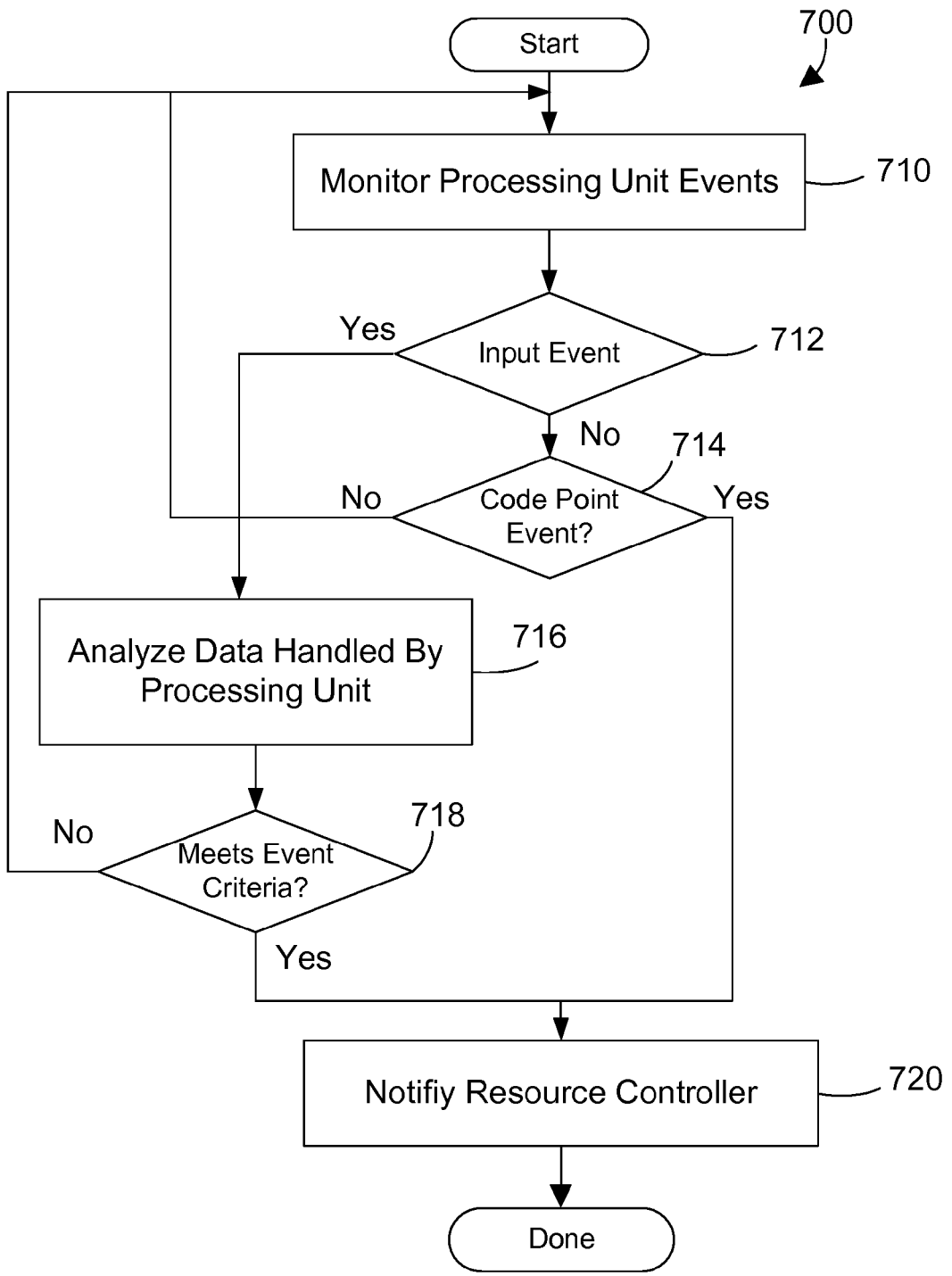
FIG. 7 is a method flow diagram of dynamic resource adjustment of a distributed computer process on a multi-node computer system.

FIG. 7 shows a method 700 for dynamic resource adjustment of a distributed computer process on a multi-node computer system. The steps in method 700 are preferably performed by a resource scheduler 143 in the service node 140. The first step is to monitor processing unit events (step 710). If a detected event is an data event (step 712=yes), then analyze the data handled by the processing unit (step 716) and determine if the data meets the event criteria (step 718). If the data does not meet the event criteria (step 718=no) then return to step 710. If the data does meet the event criteria (step 718=yes) then notify the resource controller of the event (step 720). If the detected event is not an data event (step 712=no) then check for a code event (step 714). If the detected event is not a code point event (step 714=no), then return to step 710. If the detected event is a code point event (step 714=yes), then notify the resource controller of the event (step 720). The method is then done.

Figure 8:
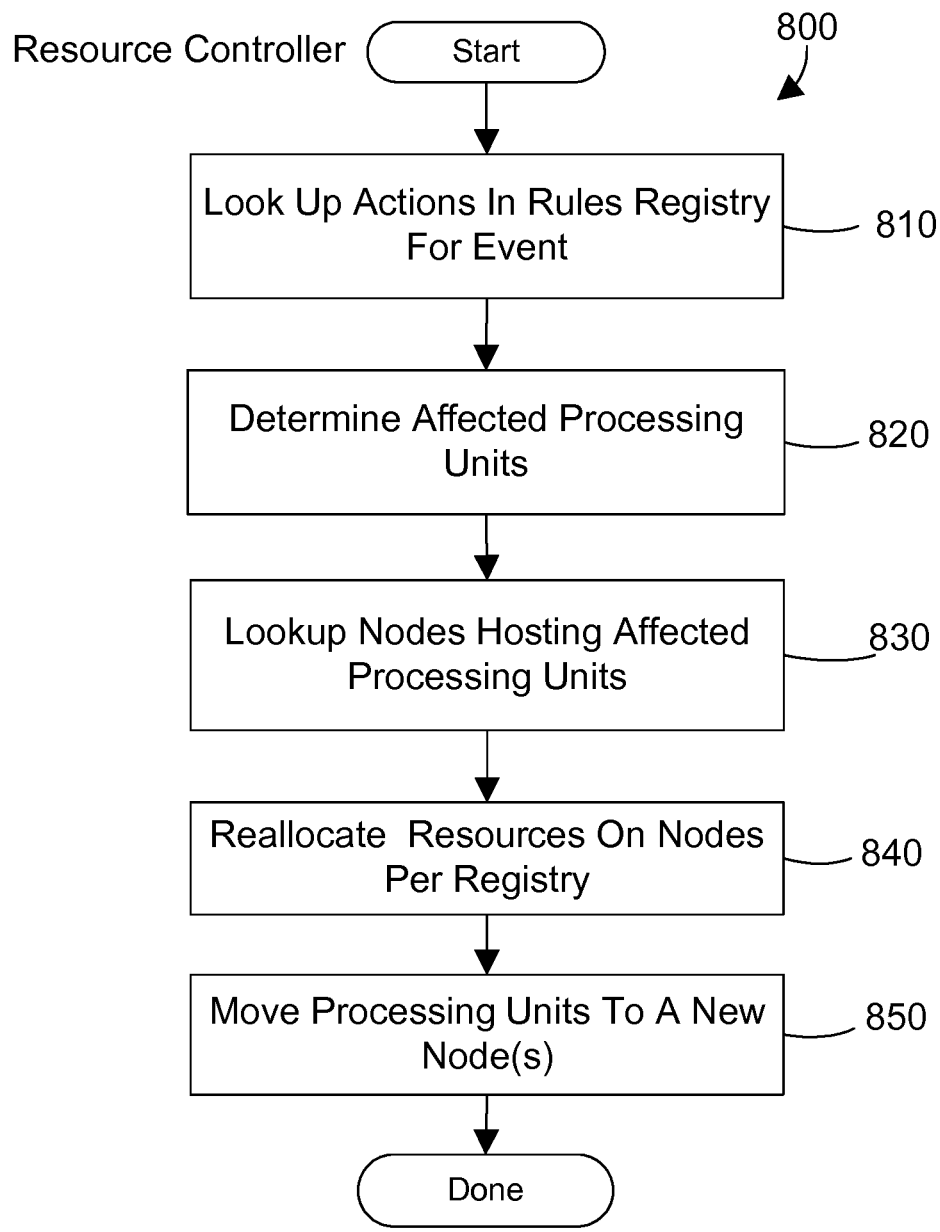
FIG. 8 is a method flow diagram that illustrates the resource controller performing dynamic resource adjustment of a distributed computer process on a multi-node computer system.

FIG. 8 shows a method 800 performing dynamic resource adjustment of a distributed computer process on a multi-node computer system. The steps in method 800 are preferably performed by a resource scheduler 143 in the service node 140 when notified by a resource controller of a detected event. The first step is to look up the actions in the resource registry for the event (step 810). Next, determine the affected processing units (step 820). Next, lookup the nodes hosting the affected processing units (step 830) and reallocate the resources on the nodes of the processing units per the actions indicated in the rules registry (step 840). Where necessary, move processing units to a new node to reallocate the resources for a processing unit (step 850). The method is then done.

An apparatus and method is described herein directed to dynamically adjusting the resources available to a processing unit of a distributed computer process executing on a multi-node computer system. One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

The invention claimed is:

1. A multi-node computer system comprising:
a plurality of compute nodes having compute resources;
a plurality of processing units that comprise a distributed process executing on the plurality of compute nodes;
a rules registry with a rule that comprises an action with an associated event, where the action indicates an adjustment of compute resources available to a first processing unit and a second processing unit upon detection of the associated event in a third processing unit, wherein the first processing unit is located on a compute node downstream from the third processing unit, and the second processing unit is located on a compute node upstream from the third processing unit;
an event detection mechanism that detects the occurrence of the associated event in the rules registry; and
a resource controller that dynamically adjusts the compute resources available to the first processing unit and the second processing unit according to the action listed in the rules registry corresponding to the associated event upon detection of the associated event in the third processing unit, wherein upon detection of the associated event in the third processing unit, the resource controller dynamically adjusts compute resources by increasing compute resources for the first processing unit and decreasing compute resources for the second processing unit.

2. The computer system of claim 1 wherein the compute resources in the rules registry comprise central processing unit, memory, and network resources indicated.

3. The computer system of claim 1 wherein the rules registry lists actions and events that include the following: increase processing unit resources upon detection of a quantity of input data; decrease processing unit resources upon detection of a quantity of input data; increase processing unit resources upon detection of a specific type of data; decrease processing unit resources upon detection of a specific type of data; increase computer processing unit resources upon detection of a code point in a processing unit; and decrease computer processing unit resources upon detection of a code point in a processing unit.

4. The computer system of claim 1 wherein the event detection mechanism comprises code placed in a processing unit to detect the associated event in the rules registry.

5. A computer-readable article of manufacture comprising:
a rules registry with a rule that comprises an action with an associated event, where the action indicates an adjustment of compute resources available to a first processing unit and a second processing unit upon detection of the associated event in a third processing unit, wherein the first processing unit is located on a compute node downstream from the third processing unit and the second processing unit is located on a compute node upstream from the third processing unit;

an event detection mechanism that detects the occurrence of the associated event in the rules registry;

a resource controller that dynamically adjusts the compute resources available to the first processing unit and the second processing unit according to the action listed in the rules registry upon detection of the associated event in the third processing unit, wherein upon detection of the associated event in the third processing unit, the resource controller dynamically adjusts the compute resources by increasing compute resources for the first processing unit and decreasing compute resources for the second processing unit; and non-transitory computer recordable media bearing the rules registry, the event detection mechanism and the resource controller.

6. The article of manufacture of claim 5 wherein the compute resources indicated in the rules registry comprise computer processing unit, memory, and network resources.

7. The article of manufacture of claim 5 wherein the rules registry lists actions and events that include the following: increase processing unit resources upon detection of a quantity of input data; decrease processing unit resources upon detection of a quantity of input data; increase processing unit resources upon detection of a specific type of data; decrease processing unit resources upon detection of a specific type of data; increase computer processing unit resources upon detection of a code point in a processing unit; and decrease computer processing unit resources upon detection of a code point in a processing unit.

8. The article of manufacture of claim 5 wherein the event detection mechanism comprises a piece of code placed in a processing unit to detect the associated event in the rules registry.

* * * * *